US007717655B2

(12) United States Patent
Cardona

(10) Patent No.: US 7,717,655 B2
(45) Date of Patent: May 18, 2010

(54) COMPACT WHEELCHAIR RESTRAINT SYSTEM WITH HOUSING AND RELEASE

(75) Inventor: Edgardo Cardona, Walnutport, PA (US)

(73) Assignee: Sure-Lok, Inc., Bethlehem, PA (US)

(*) Notice: Subject to any disclaimer, the term of this patent is extended or adjusted under 35 U.S.C. 154(b) by 401 days.

(21) Appl. No.: 11/903,890

(22) Filed: Sep. 25, 2007

(65) Prior Publication Data

US 2008/0247837 A1 Oct. 9, 2008

Related U.S. Application Data

(60) Provisional application No. 60/847,260, filed on Sep. 26, 2006.

(51) Int. Cl.
*B60P 7/08* (2006.01)

(52) U.S. Cl. .................................. 410/7; 410/4; 410/23

(58) Field of Classification Search ..................... 410/4, 410/7, 23, 9–12, 19, 21, 22, 51; 280/304.1; 296/65.04; 297/DIG. 4
See application file for complete search history.

(56) References Cited

U.S. PATENT DOCUMENTS

| | | | | |
|---|---|---|---|---|
| 4,103,934 | A | 8/1978 | Arnholt et al. | |
| 4,162,715 | A | 7/1979 | Coulombe | |
| 4,320,878 | A | 3/1982 | Takada | |
| 4,574,911 | A | 3/1986 | North | |
| 4,623,289 | A | 11/1986 | Apostolos | |
| 4,655,312 | A | 4/1987 | Frantom et al. | |
| 4,886,403 | A | 12/1989 | Gresham | |
| 4,995,775 | A | 2/1991 | Gresham | |
| 5,165,498 | A | 11/1992 | Garboli et al. | |
| 5,388,937 | A * | 2/1995 | Farsai | 410/9 |
| 5,628,595 | A | 5/1997 | Harris | |
| 5,888,038 | A | 3/1999 | Ditch et al. | |
| 6,113,325 | A | 9/2000 | Craft | |
| 6,231,283 | B1 | 5/2001 | Stowers | |
| 6,428,254 | B2 | 8/2002 | Craft | |
| 6,471,454 | B1 | 10/2002 | Koller | |
| 6,524,039 | B1 | 2/2003 | Magnuson et al. | |
| 6,575,677 | B2 | 6/2003 | Craft | |
| 6,698,983 | B1 | 3/2004 | Kiernan et al. | |
| 6,776,564 | B1 | 8/2004 | Kiernan et al. | |
| 6,966,733 | B2 | 11/2005 | Craft | |
| 7,108,466 | B2 | 9/2006 | Panzarella et al. | |
| 2006/0110230 | A1 | 5/2006 | Girardin | |

* cited by examiner

*Primary Examiner*—Stephen Gordon
(74) *Attorney, Agent, or Firm*—Young Basile

(57) ABSTRACT

An apparatus for restraining a mobility aid in the interior of a vehicle includes two or more retractor spools contained within a common housing. The retractor spools carry flexible webbed belts, and are operated by common actuator mechanism having a direct mechanical attachment to the spools. The various elements of the apparatus are contained within a common housing which is easily mounted to a bulkhead or under a foldable seat. A third retractor is mounted in opposition permitting both the front and rear of the mobility aid to be easily secured by the occupant of the mobility aid without assistance of the operator of the vehicle. The operative portions of the retractor are designed to be positioned so as not to present an obstacle to other users of the vehicle in which the apparatus may be installed. A timing mechanism is provided for at least one of the retractor spools to allow at least one of the retractor spools to be freely manipulated during a predetermined time interval.

6 Claims, 11 Drawing Sheets

COMPACT WHEELCHAIR RESTRAINT SYSTEM WITH HOUSING AND RELEASE

PRIORITY CLAIM

This application claims the benefit of U.S. Provisional Application No. 60/847,260, filed Sep. 26, 2006.

FIELD OF THE INVENTION

The invention relates to an apparatus for securing an object, such as a wheelchair, to the interior of a vehicle. More particularly, the invention includes a compact and self-contained assembly comprising a plurality of belt retractors operated by a single control.

BACKGROUND

Accommodation of mobility aids, such as wheelchairs, in public transit vehicles is now commonplace. For the convenience of all of the passengers, methods and equipment have been developed for quickly and easily securing wheelchairs in mass transit vehicles. However, a recognized problem in accommodating such mobility aids in buses, train cars, and the like, is the need for reliably securing the mobility aid to prevent its unwanted movement while the vehicle is in motion.

It is desirable in mass transit vehicles to have mobility aid securement systems which are versatile, i.e., that may be positioned so as not to interfere with the use of the vehicle by ambulatory passengers. Preferably, wheelchair restraint systems should be readily stowable so as not to present any obstacle, intrusion or tripping hazard when the restraint systems are not in use. It is also desirable that such systems be readily convertible so that they may be integrated with conventional seating systems in such a way that conventional seating systems may still be used when the wheelchair restraint systems are not needed. It is also desirable to have the restraint systems physically retracted or stowed so as not to present any undue hazard to other passengers when the wheelchair restraint system is not in use.

At the same time, a wheelchair restraint system should be readily accessible to the wheelchair-using passenger, and operable by the vehicle operator, or by the passenger without the need for the assistance of the vehicle driver or any other party. Further, a wheelchair restraint system should be convenient for use, preferably allowing one-handed operation. Preferably, during the positioning and securement of a wheelchair in the vehicle, various elements of the restraint system should be readily manipulatable without the requirements for complex movements, such as the activation of a release with one hand and the activation of a portion of the restraint with the other.

To accomplish these goals, a number of prior art devices have been suggested and, in some cases, developed.

One such class of systems is disclosed by Gresham in U.S. Pat. No. 4,886,403. The system therein disclosed utilizes a plurality of floor-mounted tracks to which are releasably attached one or more seat belts and one or more ratcheting spool assemblies. While this type of system provides some measure of safety to the wheelchair occupant, these systems are difficult to use for a number of reasons. First, the belt assemblies are separate and must be retrieved and appropriately located in and secured to the track and to the wheelchair, and they must be manually tensioned by operation of a ratchet handle or crank.

A more desirable system is disclosed by Kiernan, et al., in U.S. Pat. No. 6,776,564, in which a plurality of belt retractor assemblies are permanently secured to the four corners of a wheelchair station, eliminating the requirement for retrieval and mounting of portions of the restraint system. However, each belt assembly is separate and separately operable, requiring the assistance of an operator. Similar limitations are found in the operation of systems such as that taught by Kraft in U.S. Pat. No. 6,428,254 and Ditch, U.S. Pat. No. 5,888,038.

A somewhat better approach is disclosed by Magnuson, et al., in U.S. Pat. No. 6,524,039, which discloses the use of a pair of retractor assemblies which can be controlled by a common actuator. However, this invention suffers from one of the limitations of the previously described prior art, in that it uses separate exposed retractor bodies which can easily snag or catch other passengers in the vehicle. Further, Magnuson, et al. relies upon a complicated system of cables for interconnecting the remote actuator to the retractors, which is expensive, complicated to install and maintain, and unreliable after repeated use.

All of the prior art systems, however, are limited in that they require the simultaneous activation of a control, usually to release a belt retractor, coupled with movement of the belt to a securing position on a wheelchair. Once the belt has been secured to the wheelchair, the release mechanism may need to again be activated to effect locking. In Magnuson, for example, a release lever is operated with one hand, while the operator extends belts from the retractor with the other hand. Then, once the belts are attached to the wheelchair, the operator releases a lock allowing the belts to retract.

The present system, however, contemplates a timed release mechanism which allows the spools of the retractor mechanism to be freely extended and retracted for a predetermined time interval after actuation of a mechanical or electromechanical control. This system allows for single-handed operation, thereby greatly simplifying the securement and removal of the restraint system from a wheelchair.

SUMMARY OF THE INVENTION

In accordance with the present invention, an apparatus is provided for securing a wheelchair from movement within a wheelchair space or station in a mass transit vehicle. One or more retractor spools are located in a common housing, with the spools, their associated flexible webbed belts, and their actuator mechanisms contained within the same housing. The housing is designed so that only hooks and a small portion of the end of the flexible belts protrude from the housing. The housing presents an essentially flush or flat surface on its exposed exterior, thereby permitting the housing to be secured within or to a vehicle bulkhead, or under a foldable vehicle seat while presenting little or no obstacle to other passengers using the vehicle when the retractor system is not in use.

The plurality of retractor spools contained within the housing are physically aligned to permit a common mechanical or electromechanical release mechanism to directly engage the retractor mechanism to provide a simple, inexpensive and reliable means for locking and unlocking the retractor mechanism, thereby allowing the wheelchair-engaging belts to be easily positioned and locked to secure the wheelchair from movement within a typical mass transit vehicle.

At the same time, the system includes a single or multiple point wheelchair securement system for the front of the wheelchair, which is placed in the outboard section of the wheelchair station within the vehicle.

The apparatus herein described, by virtue of its compact configuration, is also easily mountable underneath a foldable seat assembly, allowing the apparatus to be placed out of the way when not in use and allowing the wheelchair station to be utilized for ambulatory passengers, as needed. Further, the controls for the apparatus are central, allowing the device to be easily operated by the vehicle operator or by the occupant of a wheelchair without assistance from the vehicle operator or other passengers. The system may be provided with a positive locking actuator which provides visual indicia of the locked position of the retractors within the assembly. Moreover, the actuator may be provided with an electrically operated actuator. In either case, the apparatus may also be provided with a time-delay circuit or mechanism, which will allow easy manipulation of the belts within the retractor assembly for a limited period of time, following which the retractors will revert to the locked position without further action on the part of the operator of the vehicle or occupant of the wheelchair. Additionally, the system may be equipped with a remote annunciator which alerts the user as well as the driver of the vehicle when the retractors within the assembly are in the unlocked (and hence, unsafe) position.

In use, the occupant of the wheelchair moves the wheelchair into a position in the wheelchair station. It may be necessary, prior to this maneuver, for one or more foldable seats of the vehicle to be moved into the folded position to allow full access to the wheelchair station. The vehicle operator, or, in some cases, the wheelchair occupant, then attaches the front restraint to a forward portion on the frame of the wheelchair, and then either tensions the front restraint or moves the wheelchair backward to tension the connection between the front restraint and the wheelchair. The operator or occupant then operates the release lever or the release switch on the rear retractor module, thereby initiating a timed interval during which the retractor assemblies within the retractor module are conditioned to permit free rotation of the retractor spools and extraction of the belts, thereby allowing hooks on the ends of the retractor belts to be attached to selected portions of the frame of the wheelchair. The retractor assemblies are biased to urge the belts to fully retract into the module when tension on them is released. As the timed interval ends, a lock assembly is simultaneously engaged within the retractor module for both retractor assemblies, thereby locking the retractor assemblies and preventing movement of the wheelchair in relation to the vehicle until such time as the release mechanism is again activated.

DETAILED DESCRIPTION OF THE EMBODIMENTS

Figure 1:
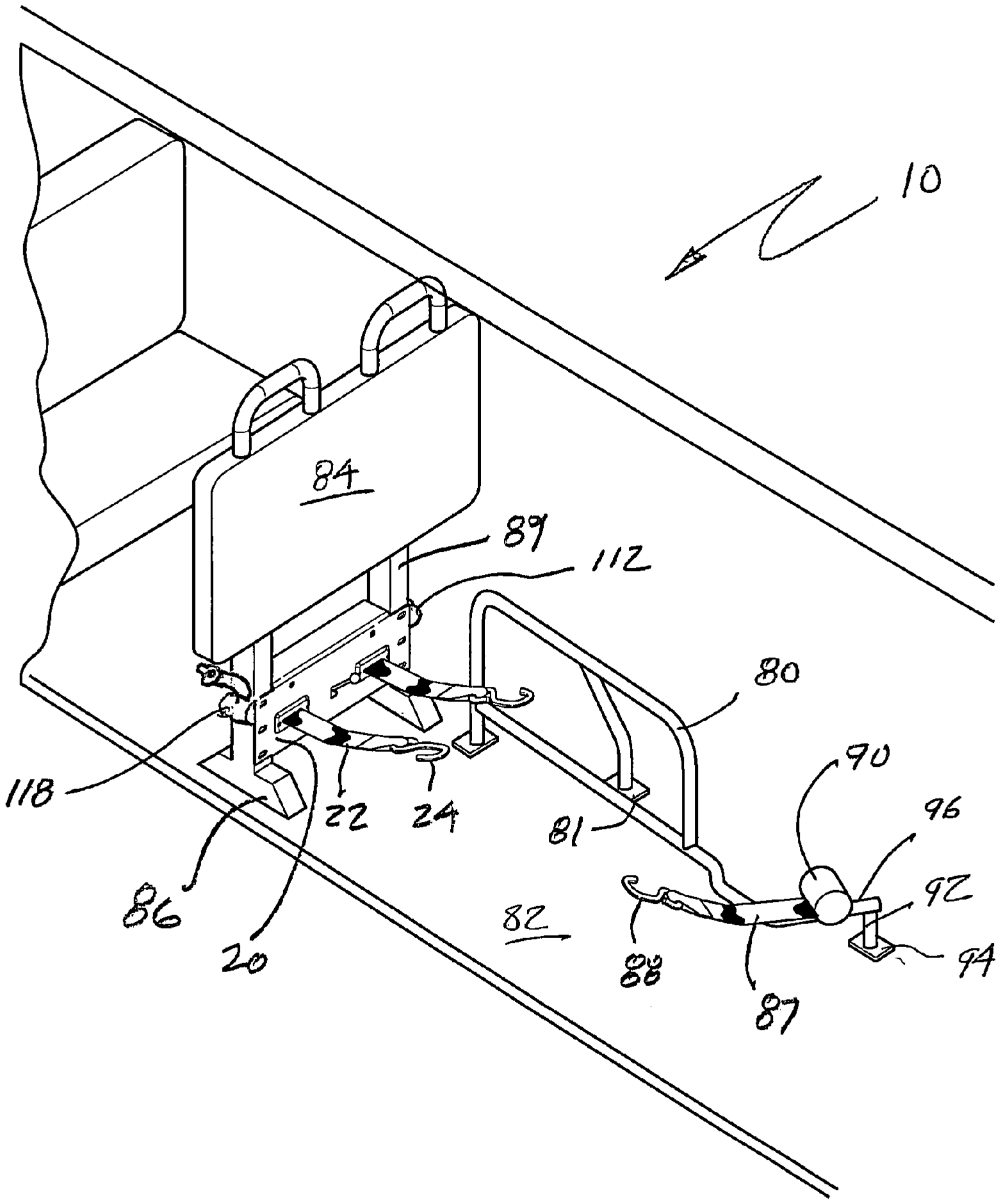
FIG. 1 is a perspective view of the invention oriented within its intended environment.
Figure 2:
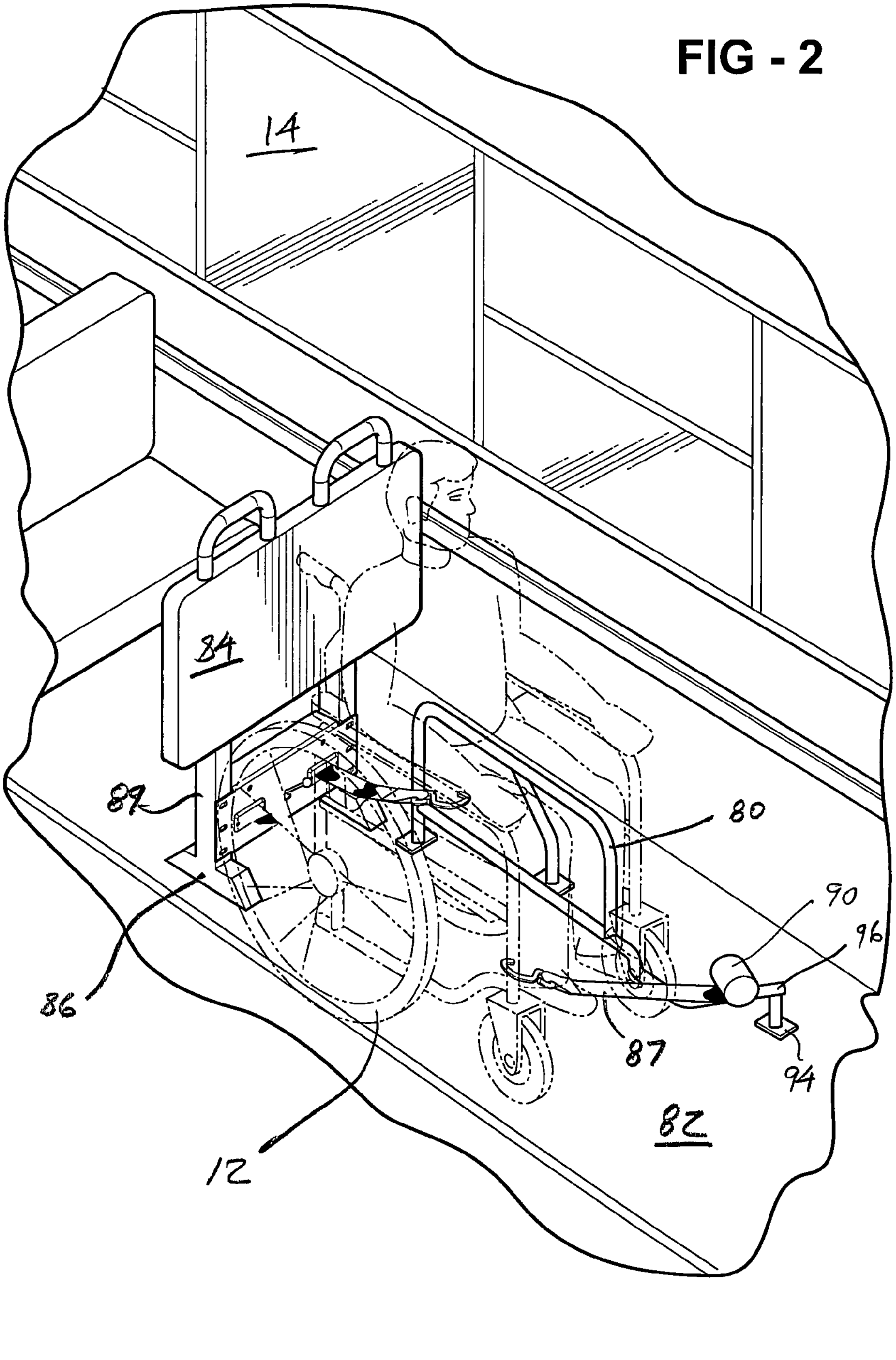
FIG. 2 is a perspective view of the invention oriented within its intended environment in use with a typical wheelchair.

With reference first to FIG. 1 and FIG. 2, the overall environment in which the invention is utilized will be best appreciated. In a typical vehicle 14, the apparatus 10 is utilized to secure a wheelchair 12 within a pre-designated location or "station" within a vehicle, such as a bus, train car or other vehicle. One lateral side of the area or station in which the wheelchair 12 is secured is provided with a barrier 80 which is affixed to the floor 82 of the vehicle 14 utilizing mounting plates 81. Barrier 80 serves to restrict the lateral movement of a wheelchair 12 positioned within the wheelchair station, and also to provide a supplemental hand hold which may be used by a wheelchair occupant during the process of securing the wheelchair 12 in the station.

Typically, the wheelchair station is defined in the rear by bulkhead 84, at one lateral side by the barrier 80, at the other lateral side by the aisle of the vehicle, and in the front by the back of the next seat or collection of seats which may be found within the vehicle's interior.

Bulkhead 84 is typically secured to bulkhead frame 89, which is in turn secured to the floor 82 of the vehicle 14 by bulkhead bases 86. Bulkhead bases 86 are secured to the floor 82 using nuts, bolts, screws or similar fasteners. Affixed to the sides of the bulkhead frame 89 are one or more belt assemblies 118, including retractable seat belts, seat belt receptacles 112, retractable shoulder belts and shoulder belt receptacles (not shown) designed to be utilized by the occupant of a wheelchair 12 positioned within the wheelchair station, simultaneously with the use of wheelchair-securing belts 22 which will be described in further detail herein.

Securing of the wheelchair 12 within the station is affected by rear belts 22 and rear hooks 24. Belts 22 are retractable within the retractor module 20.

The front of the wheelchair is typically secured to the station by a front belt 87 provided with a hook 88 and secured to a front retractor 90 mounted to a retractor base 96 and a retractor base support 92 utilizing a front retractor pivot mounting plate 94. It will be appreciated from FIG. 2 that a wheelchair positioned within the station may be secured against fore, aft and lateral movement by belts 22 and 87 when tension is applied to such belts.

Front retractor 90 is provided with an internal spool about which is wound a front belt 87. By manipulation of one or more controls on the front belt retractor 90, a suitable portion of front belt 87 may be withdrawn from the retractor 90 or wound up onto spool contained within retractor 90, thereby regulating the length of the portion of the front belt 87 between the housing of the front retractor 90 and the hook 88. Regulation of this length of belt 87 allows selective positioning of the hook 88 in relation to the wheelchair 12 and the vehicle 14 in which the wheelchair 12 is being carried.

Figure 3:
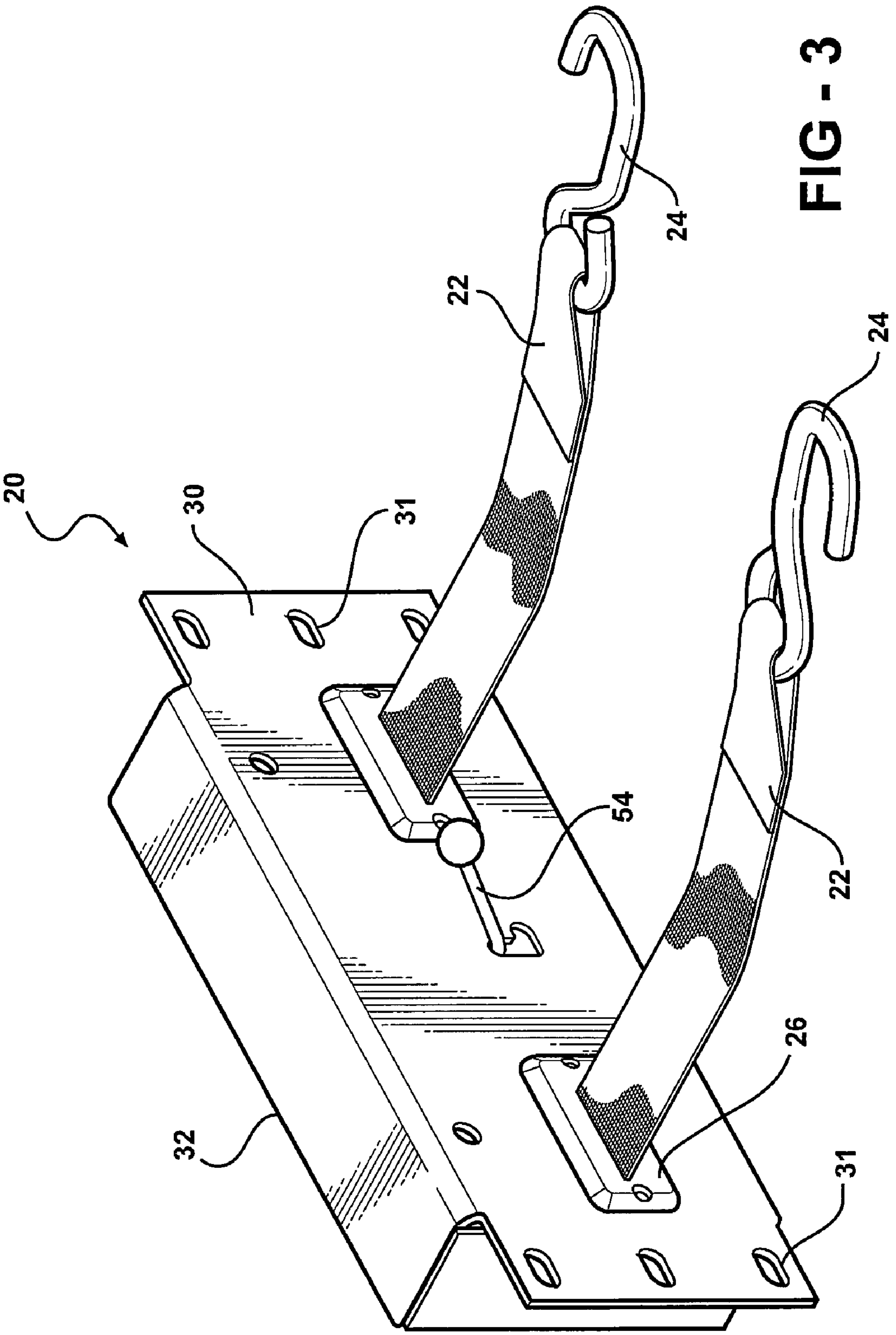
FIG. 3 is a perspective view of the retractor module.

The operation of retractor module 20 will be best understood first by reference to FIG. 3, which depicts the retractor module 20, and more specifically, retractor module 20 having a housing front 30 and a housing rear 32 which, when assembled, form a 6-sided enclosure which substantially surrounds and encloses the operating elements of the retractor module 20. The housing may also comprise the housing formed by an existing bulkhead in a vehicle. Belts 22 are selectively spooled on retractor assembly spools which will be described in further detail herein. At one end of each of the belts 22 is a hook 24, which is preferably an open, J-shaped hook to permit easy engagement of the hook 24 with a portion of a wheelchair 12. To insure that belts 22 are properly aligned for retraction into the retractor module 20, the housing front 30 has affixed thereto belt guides 26 which serve to guide and flatten belts 22 as they retract into the retractor module 20. To permit the belts 22 to be withdrawn from the retractor module 22, an external release lever 54 is provided, the operation of which will be described in detail herein.

Figure 4:
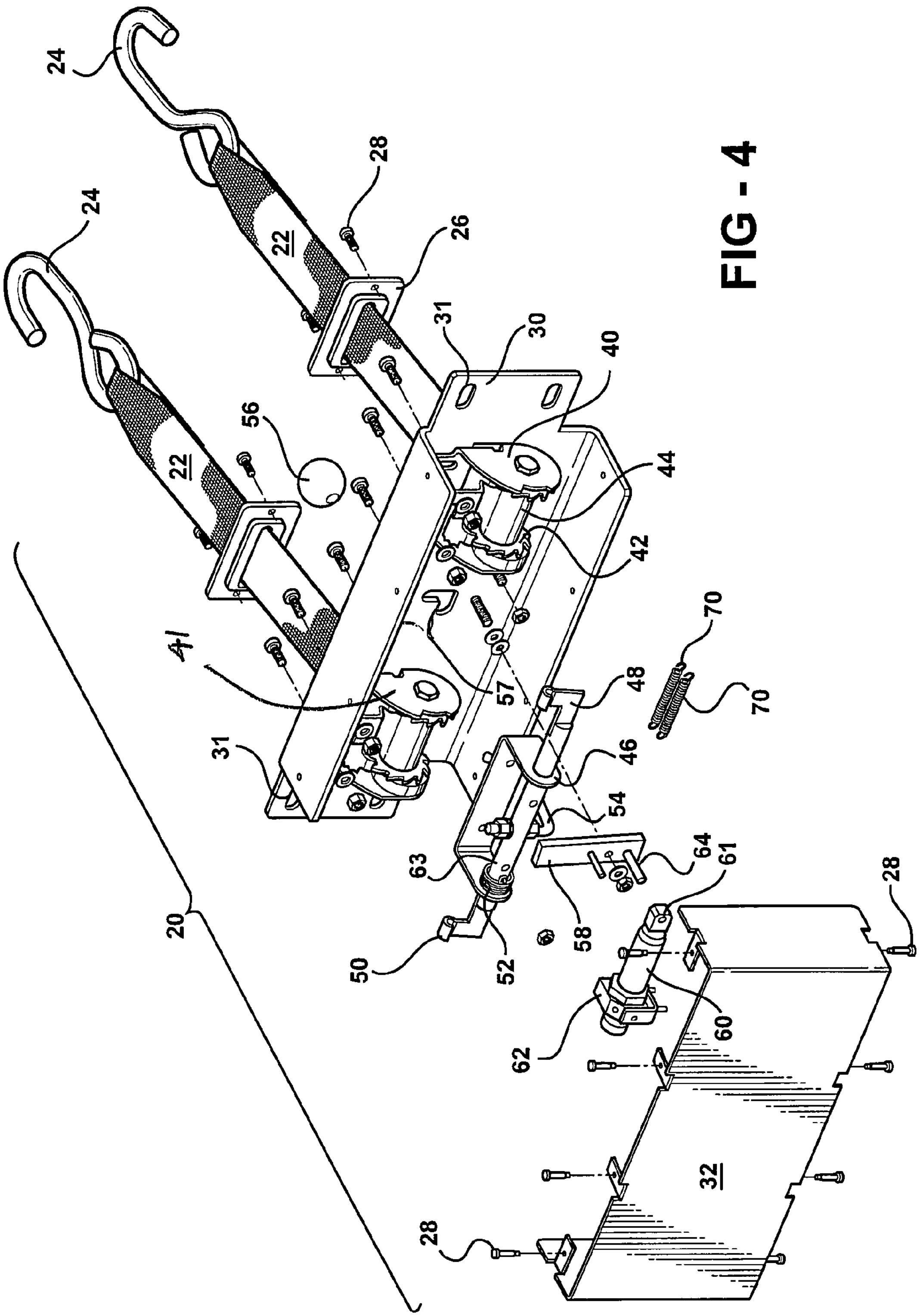
FIG. 4 is an exploded perspective view of the retractor module.

With reference now to FIG. 4, the mechanical operation of the retractor module 20 is explained as follows: attached to the interior side of housing front 30 is a pair of retractor assemblies 40. Typically, such retractor assemblies 40 are secured by means of fasteners 28, which typically include a screw or bolt, one or more washers and one or more nuts. Each retractor assembly 40 includes a frame 41 supporting a retractor spool 44. The ends of the retractor spools 44 comprise sprockets 42. In the preferred embodiment, spools 44 are spring-biased within spool frames 41, urging belts 22 to be wound around spools 44 whenever tension on belts 22 is released. It is of critical importance, however, that the extension of belts 22 from spools 44 be controlled absolutely, so that extension of belts 22 may take place only under certain conditions. When spools 44 are appropriately locked in relation to spool frames 41, belts 22 are restricted from further extension from the retractor module 20, thereby holding the wheelchair 12 secure from forward movement in relation to vehicle 14.

To achieve this selective locking result, each retractor assembly 40 is provided with a retractor lock pawl 72 which is pivotally mounted adjacent to retractor sprockets 42. When brought into engagement with sprockets 42, retractor lock pawl 72 prevents spools 44 from rotating, and thereby prevents further extension of belts 22 from spools 44. Retractor lock pawl 72 may be disengaged from sprockets 42 by release shaft extensions 48. Release shaft extensions 48 are connected to release shaft 63. Release shaft 63 is biased toward the locked position as will be further described herein. The release shaft 63 is interconnected with release lever 54. Release shaft bracket 46 is secured to the interior of housing front 30. When fully assembled, release arm 58 rotates in response to movement of release lever 54 thereby activating velocity controller 60.

In one embodiment, velocity controller 60 is in the form of a pneumatic or hydraulic timer secured to housing front 30 by velocity controller mount 62. As release lever 54 is moved laterally, it engages the upper end of release arm 58, which then rotates and urges velocity controller actuator 61 out of its retracted position within velocity controller 60. Velocity controller actuator 61 is pneumatically or hydraulic biased to retract into the body velocity controller 60, so that after a short period of time, velocity controller actuator 61 returns to its initial position fully retracted within the body of velocity controller 60. The time interval between extension of velocity controller actuator arm 61 and retraction is adjustable by a valve (not shown) mounted to velocity controller 60.

During the time that velocity controller actuator 61 is fully to partially extended from velocity controller 60, release arm 58 is restricted from rotation, which in turn restricts a rotation of release shaft 63 and release shaft extensions 48. As a result, retractor lock pawls 72 remain disengaged from sprockets 42, allowing belts 22 to be unwound from spools 44. The design of release shaft 63 and release shaft extensions 48 is such that the release shaft extensions 48 on each side of the release shaft 63 move in concert, thereby simultaneously locking and unlocking spools 44 for and against rotation. Release lever 54 may be provided at one end with a release lever knob 56 to facilitate manipulation of the release lever 54 by the user. The release lever 54 is pivotally mounted through release shaft 63, thereby allowing release lever 54 to move vertically in aperture 57 to affect rotation of release shaft 63, and at its lower limit of travel, to move horizontally within aperture 57, thereby engaging release lever 54 with release arm 58. Since release shaft 63 is biased for rotation to urge release lever 54 upward in aperture 57, release lever 54 is held in the locked position for a fail-safe condition to prevent undesired and unexpected operation of the retractor assemblies 40.

Figure 5:
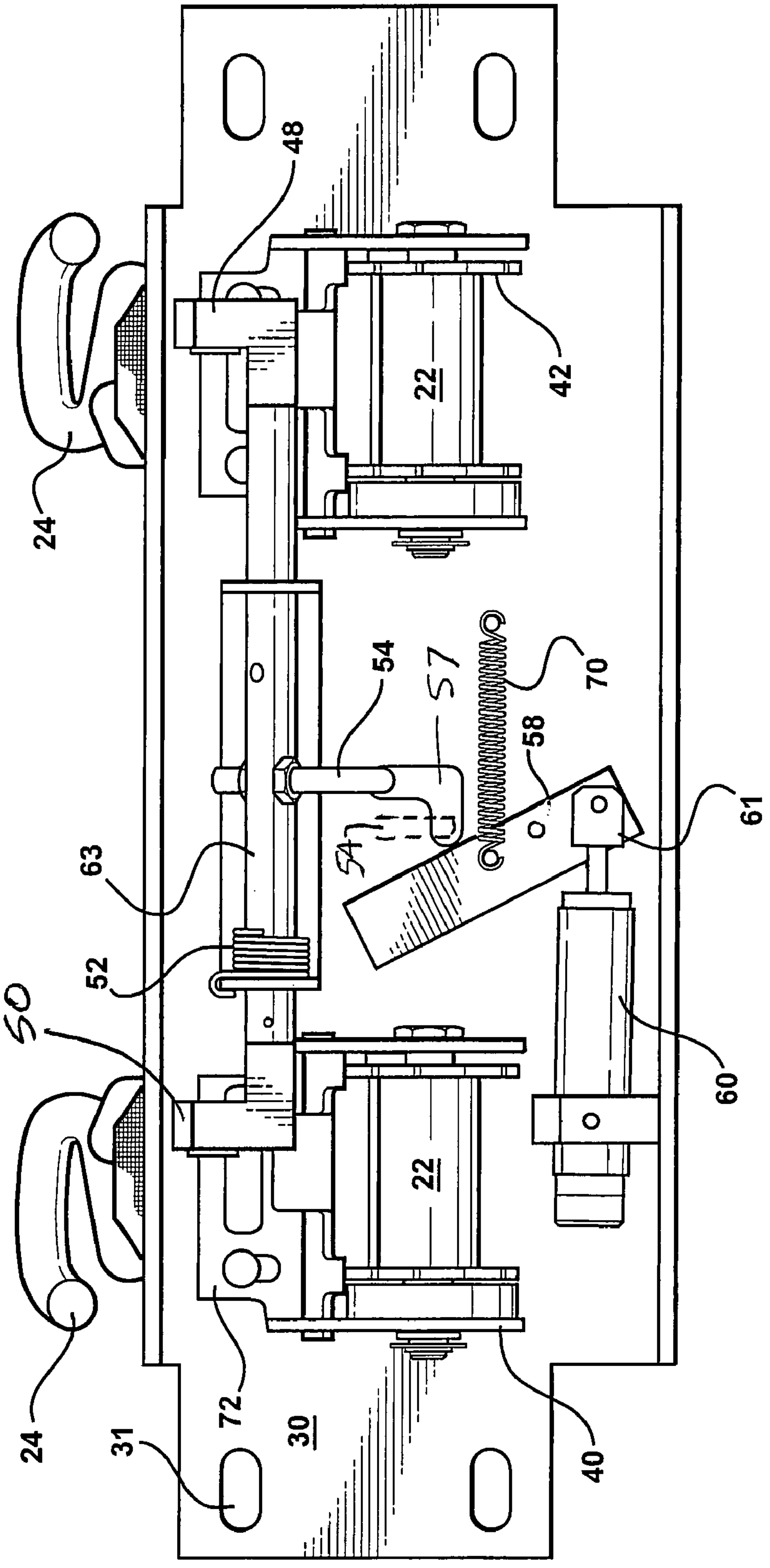
FIG. 5 is an elevational view of the interior of the retractor module, showing the major components thereof, in the release mode.
Figure 5A:
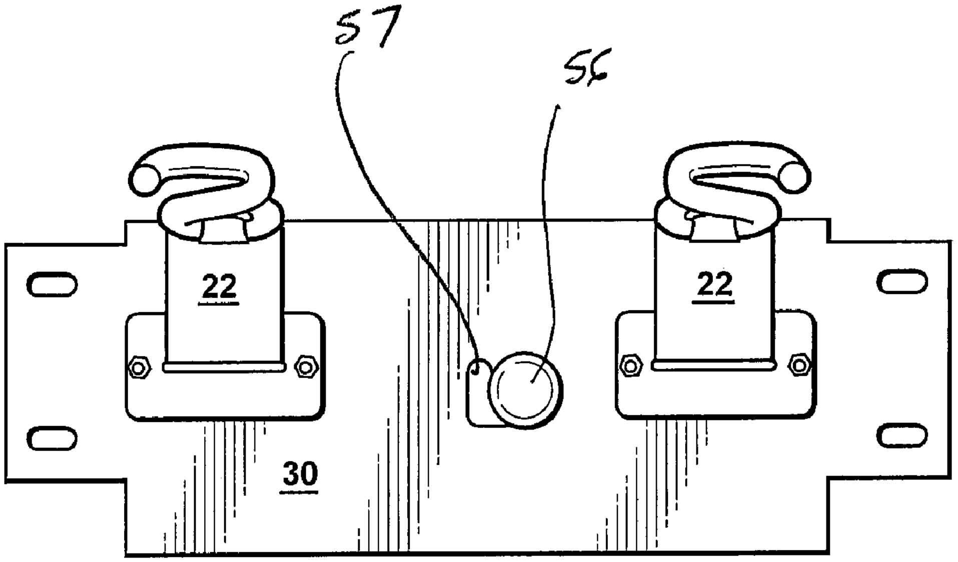
FIG. 5A is a front elevational view of the retractor module in the release mode.
Figure 5B:
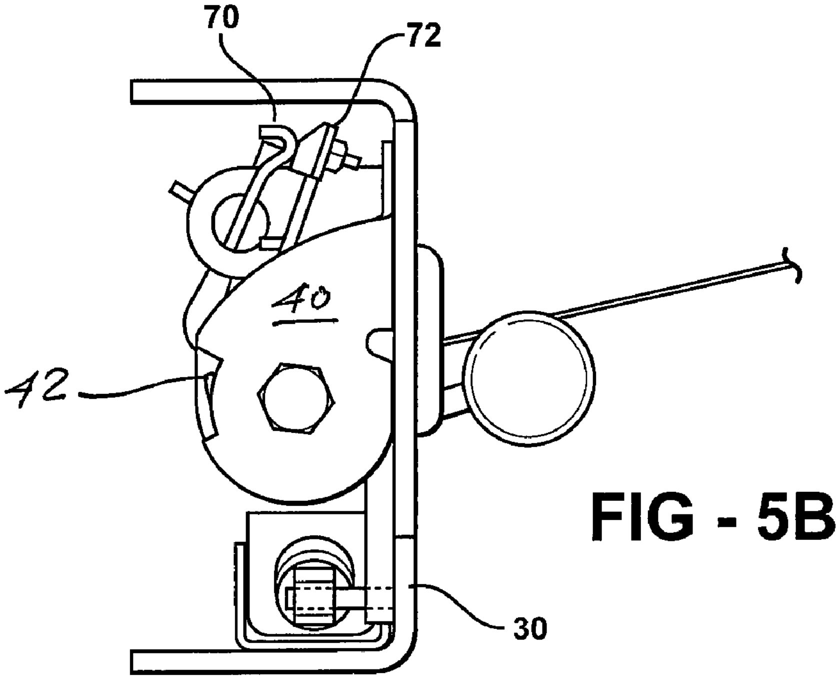
FIG. 5B is a side view of the retractor module in the release mode.

More detailed understanding of the operation of the system will be apparent from reference to FIGS. 5A, 5B and 5C, which show the interrelation of the various components of the retractor and release assembly. In FIG. 5A, the two retractor assemblies 40 are shown in relation to the release shaft 63, release shaft extensions 48, retractor lock pawl 72, release lever 54 and velocity controller 60. In the release mode, as shown in FIGS. 5, 5A and 5B, the release lever 54 has been urged downwardly and to the side within the confines of aperture 57. This action simultaneously rotates release shaft 63 and release shaft extensions 48, thereby urging the lock pawl arms 50 of release shaft extensions 48 against the retractor pawls 72. The lower ends of retractor lock pawl 72 are thus disengaged from sprockets 42 of spools 44, allowing spools 44 to rotate freely in both directions. At the same time, release lever 54 has urged release arm 58 away from its central position, extracting velocity controller actuator 61 from velocity controller 60. Attached to velocity controller actuator 61 internal to the velocity controller 60 is a piston. Attached to an upper portion of release arm 58 is a lock pawl power spring 70 which urges release arm 58 clockwise, and simultaneously urges velocity control actuator 61 toward a retracted position within velocity controller 60. Since velocity controller 60 incorporates a calibrated leak, velocity control actuator 61 retracts into velocity controller 60 at a slow, measured and predetermined rate. When velocity controller actuator 61 has fully retracted into the velocity controller 60, the upper portion of release arm 58 urges the release lever 54 to the opposite side of aperture 57, thereby permitting release lever 54 to move upward in aperture 57. This upward movement is facilitated by the bias on release shaft 63 imposed by tension spring 52. When release lever 54 has moved fully upward in aperture 57, release shaft 63 has correspondingly rotated in cooperation with the bias of tension spring 52, thereby disengaging from retractor lock pawl 72.

Figure 6:
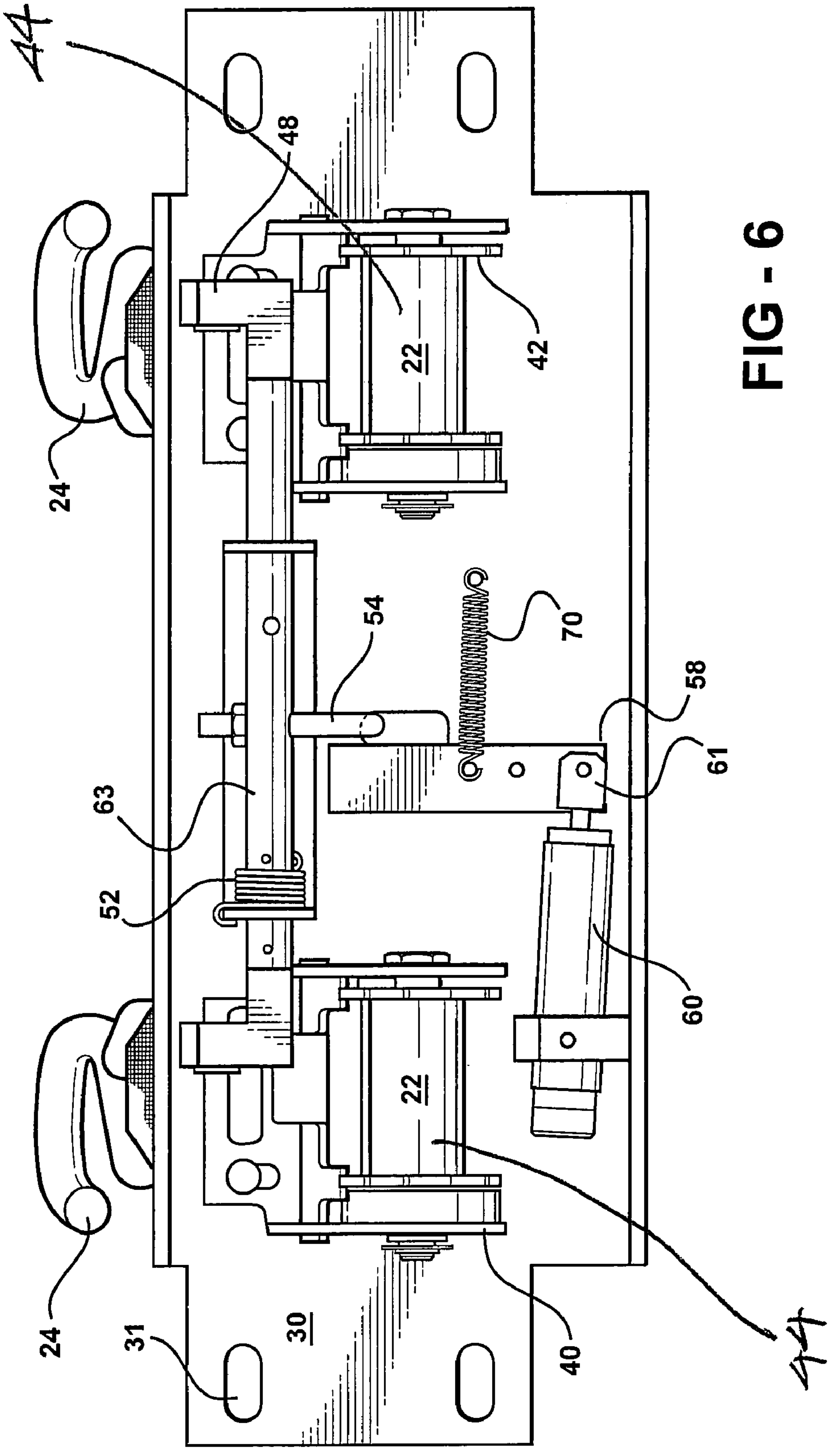
FIG. 6 is a rear elevational view of the retractor module and its major components shown in the locked mode.
Figure 6A:
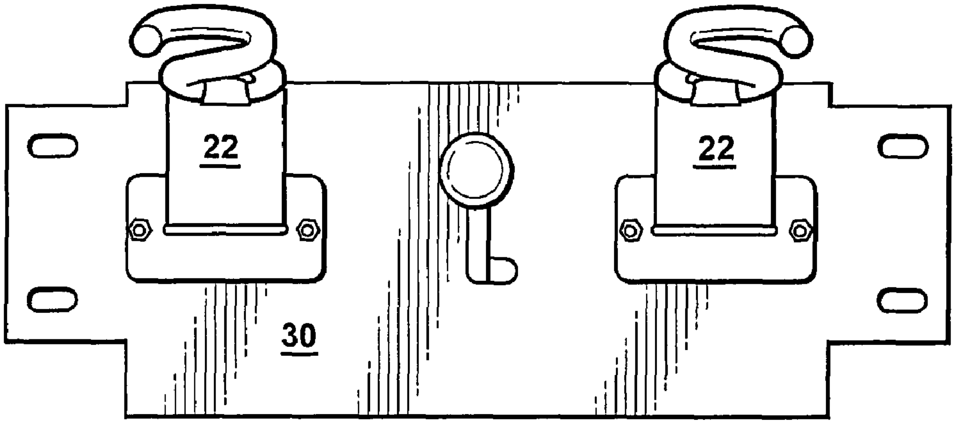
FIG. 6A is a front elevational view of the retractor module shown with the control lever in the locked mode.
Figure 6B:
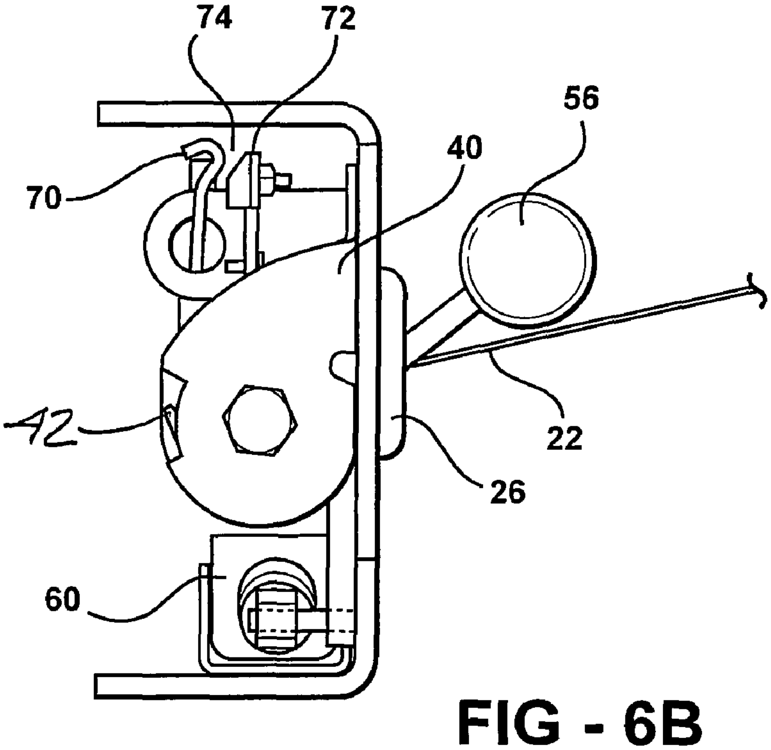
FIG. 6B is a side view of a portion of the retractor module shown in the locked mode.

The condition of the various components after upward movement of the release lever 54 is depicted in FIGS. 6, 6A and 6B. With particular attention to FIGS. 6 and 6B, it will be appreciated that with the upper ends of release shaft extensions 48 disengaged from retractor lock pawls 72 creating gap 74, lock pawls 72 are free to rotate into engagement with retractor spool 44, thereby locking retractor spool 44 from rotation in the direction which would permit withdrawal of belt 22 from retractor assembly spool 44, thereby effecting locking of the belts 22 in relation to the retractor module 20. It should also be appreciated, however, that because the sprockets 42 of spools 44 have a sawtooth shape, belts 22 may be permitted to retract and further wind around spools 44, since the lock pawl 72 does not inhibit movement of the spool in the direction of belt retraction.

Figure 9:
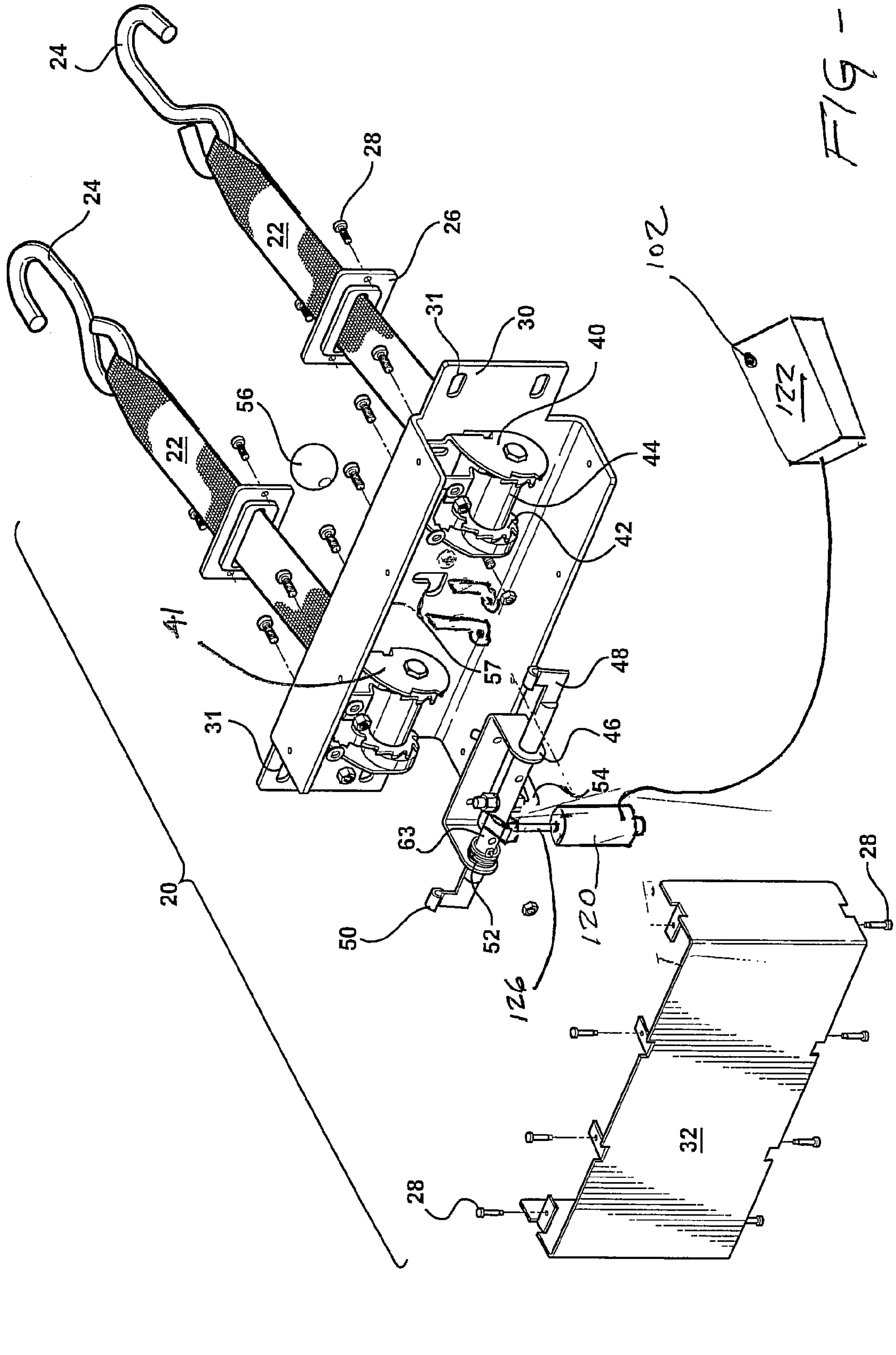
FIG. 9 is an elevational view of the interior of the module showing an electromechanical solenoid and a diagrammatic view of associated delay circuitry.

In another embodiment of the present invention as shown in FIG. 9, velocity controller 60 is replaced by an electromagnetic solenoid 120. In this embodiment, the electromagnetic solenoid 120 is powered by an electronic controller 122 containing a timing circuit. A push button 102 for operation of the release mechanism is provided to the user or vehicle operator. When the push button 102 is activated, the timer circuit begins to run, causing the plunger 126 of the solenoid 120 to retract, thereby rotating the release shaft 63 and release shaft extensions 48, again allowing free movement of retractor spools 44. After the interval set by the timer circuit has expired, the solenoid plunger extends, again rotating the release shaft 63 and the release shaft extensions 48 to effect locking of the spools 44 by virtue of engagement of the retractor lock pawl 72 with the sprockets 42.

Figure 7:
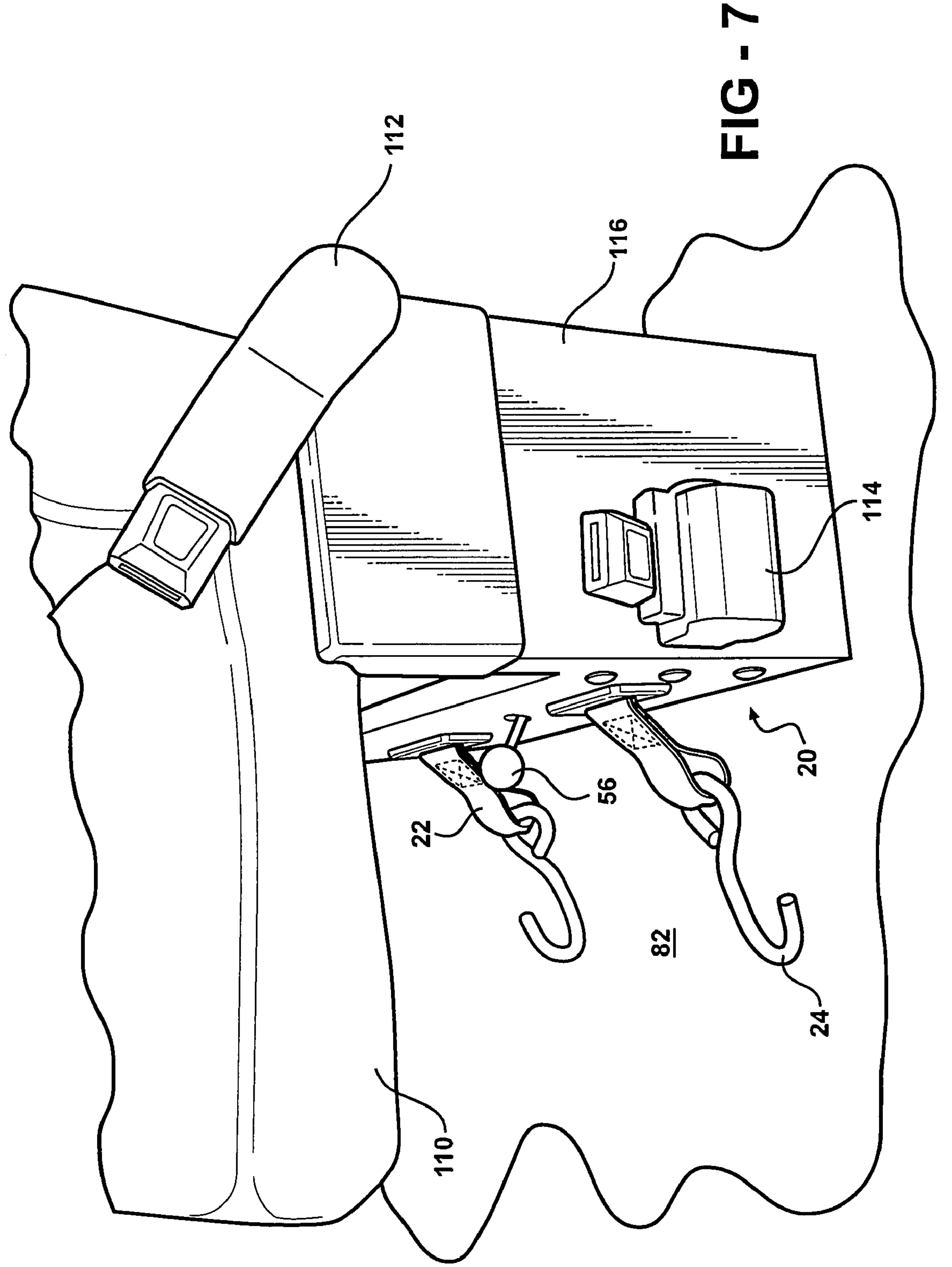
FIG. 7 is a perspective view of a second embodiment of the retractor module installed underneath a foldable seat.
Figure 8:
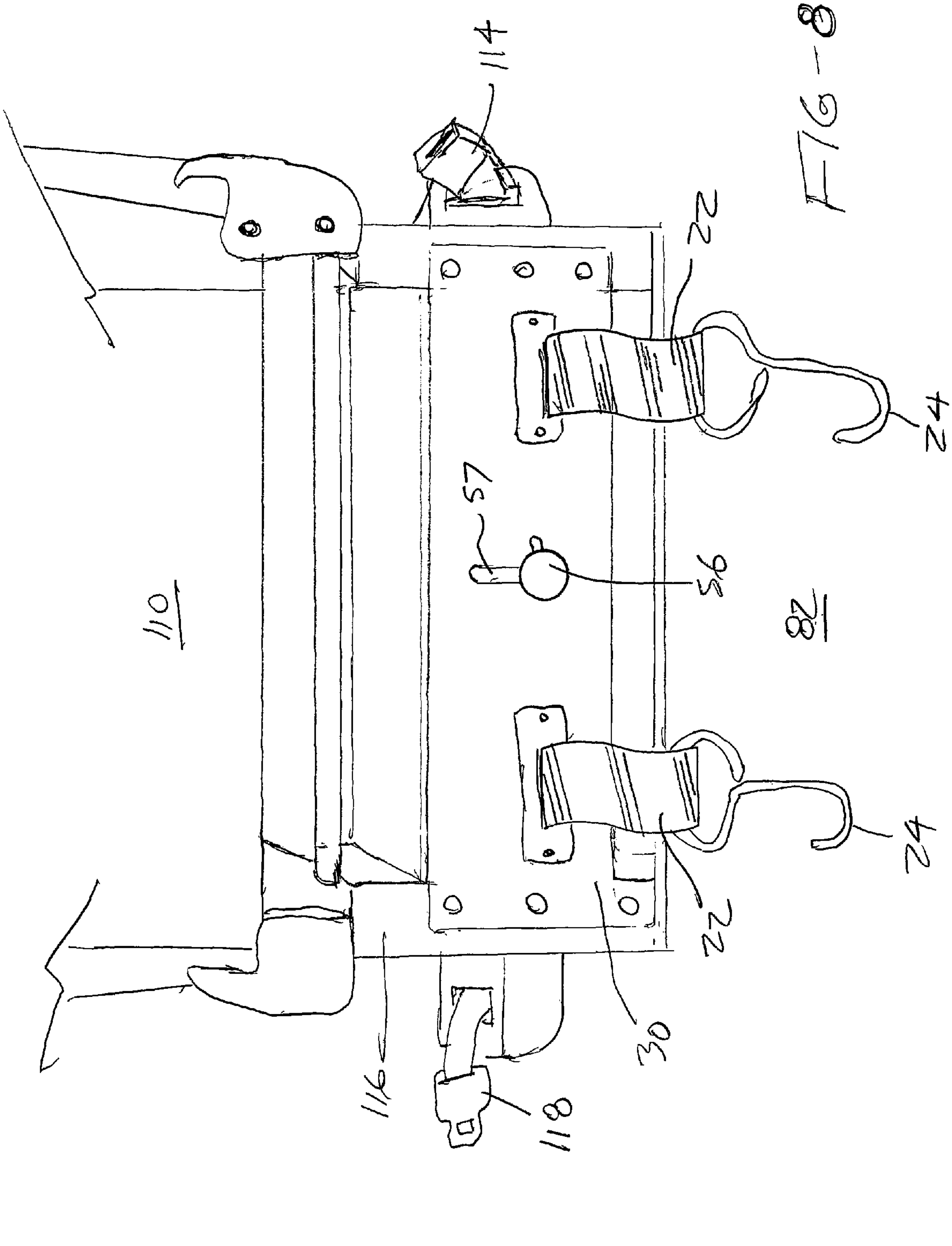
FIG. 8 is a front perspective view of the retractor module of FIG. 7.

In yet another embodiment of the invention as shown in FIGS. 7 and 8, the retractor module 20 is mounted, not to the bulkhead 84, but rather, to a seat base 116 to which is affixed a foldable seat element 110. In this embodiment, seat belt or shoulder belt components 114 may be affixed to the seat base 116 to permit the occupant of the wheelchair 12 to be individually secured in relation to the vehicle. In this embodiment, the operation of the retractor module 20 is identical to that of the first embodiment, and, in fact, the same retractor assembly housing elements are configured to fit neatly within the framework of seat base 116, which is secured to the floor 82 of the vehicle 14.

Although the above-described embodiments are drawn to a positioning of the module 20 behind a wheelchair or other mobility aid, it will be appreciated that the module 20 is equally effective in a position in front of a mobility aid, where means are provided to secure the rear of the mobility aid. It will also be appreciated that a plurality of modules 20 may be utilized, for example, one module in the front of the wheelchair and one module in the rear of the wheelchair, with each module containing one or more retractor mechanisms operated by a mechanical or electromechanical timer as above-described.

It will be appreciated that modifications within the scope of the appended claims will be apparent to those of skill in the art without departing from the invention of which I claim as follows:

The invention claimed is:

1. An apparatus for removably securing a wheelchair to an interior of a vehicle, the apparatus comprising:

a module adapted to be secured to said vehicle interior at a position behind said wheelchair;

said module comprising two separate retractor assemblies, each of said assemblies further comprising a frame, a spool, a flexible belt having a proximal end and a distal end, said proximal end secured to said spool and said distal end comprising an attachment means for securing said distal end of said belt to said wheelchair;

each said spool further comprising a ratchet end and;

each said spool being spring-biased to urge said respective belt to be wound about said spool;

a two-position latching mechanism adapted for, in a first position, simultaneous engagement with said ratchet end of both of said spools whereby said spools are simultaneously selectively prevented from rotation in one direction, said mechanism being selectively operable to a second position whereby said spools are simultaneously unlocked and allowed to rotate;

a front securement belt mounted at a position in front of said wheelchair for removable attachment to a front portion of said wheelchair and;

control means for operating said latching mechanism between said first position and said second position.

2. The apparatus of claim 1, wherein said control means is a mechanical latch further comprising time delay means for allowing movement of said spools for a predetermined time interval.

3. The apparatus of claim 1, wherein said control means is an electromechanical latch further comprising a time delay circuit for allowing movement of said spools for a predetermined time interval.

4. The apparatus of claim 1, further comprising a single attachment means for removably securing a third attachment belt to a position on a side of said wheelchair.

5. An apparatus for removably securing a wheelchair to an interior of a vehicle, the apparatus comprising:

a module adapted to be secured to said vehicle interior at a position behind said wheelchair;

said module comprising at least one retractor assembly, each of said at least one assembly further comprising a frame, a spool, a flexible belt having a proximal end and a distal end, said proximal end secured to said spool and said distal end comprising an attachment means for securing said distal end of said belt to said wheelchair;

each said spool further comprising a ratchet end and;

each said spool being spring-biased to urge said respective belt to be wound about said spool;

a two-position latching mechanism adapted for, in a first position, simultaneous engagement with said ratchet end of each said spool whereby said spool is selectively prevented from rotation in one direction, said mechanism being selectively operable to a second position whereby said spool is simultaneously unlocked and allowed to rotate; and control means for operating said latching mechanism between said first position and said second position.

6. The invention of claim 5, which further comprises front securement means mounted at a position in front of said wheelchair for removable attachment to a front portion of said wheelchair.

* * * * *